March 31, 1964  F. A. HILL  3,126,833
FLUID COMPRESSORS PARTICULARLY FOR REFRIGERATING SYSTEMS
Filed March 20, 1962                                3 Sheets-Sheet 1

Francis A. Hill
*INVENTOR.*

March 31, 1964  F. A. HILL  3,126,833
FLUID COMPRESSORS PARTICULARLY FOR REFRIGERATING SYSTEMS
Filed March 20, 1962  3 Sheets-Sheet 2

Francis A. Hill
INVENTOR.

United States Patent Office 3,126,833
Patented Mar. 31, 1964

3,126,833
FLUID COMPRESSORS PARTICULARLY FOR
REFRIGERATING SYSTEMS
Francis A. Hill, 420 Palm Circle E., Naples, Fla.
Filed Mar. 20, 1962, Ser. No. 181,069
15 Claims. (Cl. 103—126)

This application is a continuation in part of my abandoned application Serial Number 644,881, filed on March 8, 1957, and contains additional matter useful in pumps, compressors, engines and toothed gears.

In the prior art the outer gear tooth spaces of a pair of internal gears in a liquid pump had substantial clearances over the tops of the inner gear teeth on the center line at full mesh.

These clearances allowed plenty of room for the escape of fluids into the discharge port. They made the pump quieter while operating and reduced the power to drive it. In some cases the inner gear tooth spaces were under cut to provide similar clearances over the tops of the outer gear teeth on the center line at full mesh.

In gas compression these clearances would allow fluids to be carried over the tops of the teeth at full mesh from a high pressure port into a low pressure port causing re-expansion and loss of efficiency.

When the tooth space curves of the gears had snug running fits with the teeth of the other gear (without the above clearances) there was jamming of the liquid used to lubricate the gears during rotation and loss of power. Various attempts to provide relief grooves in side walls at the ends of the gears did not solve the problem.

In a gear rotating at 1725 r.p.m. each tooth space or chamber makes one rotation in about $\frac{1}{28}$ of a second. The almost closed space full of liquid or almost full rotates about 10° before full mesh to full mesh or $\frac{1}{36}$ of a revolution. $\frac{1}{36}$ multiplied by $\frac{1}{28} = \frac{1}{1008}$ of a second! In a gear 1½ inches long the speed of discharge amounts to 71 miles per hour for each tooth space. This requires a considerable amount of power. A 5 toothed gear requires 5 times as much power and a 9 tooth gear requires 9 times as much power as would gears having substantial clearances for fluid flow between teeth of one gear and bottoms of the tooth spaces of the other gear as they rotate through full mesh.

In order to eliminate this loss of power applicant changes the shape of the tips of the teeth of the inner gear, or the outer gear, or both, so that they will generate different shapes in the bottom of the tooth space curves of the other gear. Applicant also connects the tooth spaces directly to the intake and discharge ports. Ports outside of the outer gear or inside the inner gear require abutments between them. The surfaces of these abutments have to have a close running fit with the periphery of the outer gear or with the bore of the inner gear. These surfaces have radii of curvature substantially equal to that of the periphery of the outer gear or the bore of the inner gear. These radii are much larger than those of the tooth and tooth space curves described in Patent No. Re. 21,316 and Patent No. 2,666,336 of Hill and Hill.

The "Circroidal Addition" cited in the above mentioned patents controls the minimum diameters of the gears for a given ratio of teeth, eccentricity, and size of master form tooth whether circular, oval or a combination of different shapes. In order for the teeth of each gear to maintain continuous fluid tight engagements during the performance of pressure functions each part of the curves must obey the laws of the "Hill Theorem" described in Pat. No. 2,666,336.

When the tooth form of the outer gear generates the teeth and tooth spaces of the inner gear, a tool having the shape of an inner gear tooth will generate the entire curves of the Gerotor outer gear as described in Re. 21,316.

In the "rotoid" gear in Patent No. 2,666,336 the outer gear tooth form will generate the entire curves of the teeth and tooth spaces of the inner gear when it is pointed and the tool with the shape of the inner gear tooth will generate the entire curves of the outer gear. But when the outer gear tooth is circular the generated inner tooth form will NOT generate the entire curves of the outer gear. It can only generate the outer gear tooth space and sides or flanks of the outer gear teeth but not the circular tooth tips.

In both cases the concave tooth space of the outer gear has a precise stationary fit with the convex tooth form of the inner gear when on the line of centers at full mesh. Therefore when part of a convex tooth form is changed on one gear the concave tooth space shape on the other gear has to be changed also. In order to connect the tooth spaces of either gear directly to a port I either bore out the inner gear until the metal in the bottom of the tooth spaces is destroyed or removed, or I turn down the outer gear surface until the tooth spaces are opened. This boring out or turning down amounts to 0.005 to 0.010 of an inch respectively outside of or inside of the original bottoms of the tooth space curves. Once these new forms have been established tools can be made or dies shaped so that new gears can be made without the necessity of turning down or boring out.

These tooth space openings may have the same axial length of the gears or less. When they are the same length the gear teeth are separate units which have to be mounted on at least one end plate.

Turning down the outer gear reduces the radial depth of its tooth spaces. To prevent the tips of the inner gear teeth from projecting through the openings on the center line at full mesh and clashing against the inner surface of the full mesh abutment between the ports, the tips of the inner gear are turned down so as to have a close running fit with said inner surface.

Similarly, boring out the inner gear reduces the radial depth of its tooth spaces and the tips of the teeth of the outer gear have to be bored outward so as not to clash against the inside abutment at full mesh. In this instance the tips of the outer gear teeth are concave in shape instead of convex.

In both cases the heights of the gear teeth are less. This shortens the length of arc of fluid tight contacts and sizes of gear tooth chambers are less. In order to reduce this loss of capacity the circroidal addition should be as short as possible. This means that the master form tooth has to be as small as possible.

Small outer gear teeth will generate wide inner gear teeth. Wide inner gear teeth will generate wide tooth spaces between the teeth of the outer gear. These wide teeth and tooth spaces have flatter curves which permit wider tooth space openings for a given amount of reduction in radial depth of tooth chambers. The theoretical loss of capacity need be only 10% to 15% and can be offset by adding a similar amount to the length of the gears.

The small master form tooth provides much better driving angles between the teeth of the gears as they rotate through full mesh. With better driving angles less load is put on the bearings.

I prefer to have the discharge port outside of the outer gear in order to take advantage of the centrifugal forces developed at high rotary speeds. Since each chamber between the teeth of both gears expels fluids right up to the center line at full mesh the end of the discharge port should extend to it also. Theoretically the full mesh abutment should be half as thick as the width of the outer gear tooth space opening and extend from this center line toward the intake port.

These and other advantages of these new forms of Gerotor and rotoid teeth are described in more detail hereinafter.

FIGURES 1 and 2 show Gerotor gears of the previous art having 4 and 5 teeth, which have a difference of one in numbers of teeth.

Figure 17:
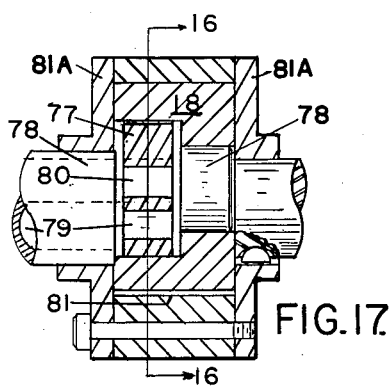

This view is a sectional elevation on line 16—16 in FIG. 17. It shows an abutment member between the ports inside the inner gear.

Figure 16:
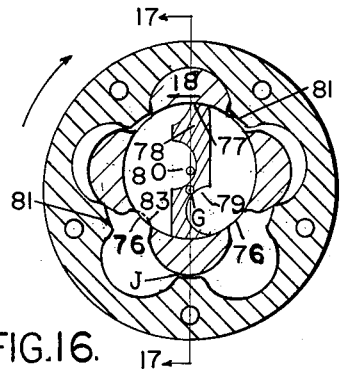
FIGURE 16 shows the gears in FIG. 2 having modified tooth tips on the outer gear teeth and modified tooth spaces on the inner gear teeth.

FIGURE 17 is a sectional elevation of FIG. 16 on line 17—17.

Figure 18:
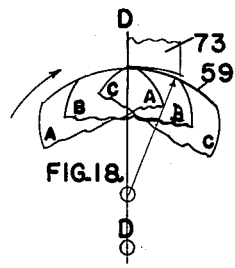

FIGURE 18 shows 3 positions of an inner tooth passing under the full mesh abutment.

Figure 19:
Figure 20:
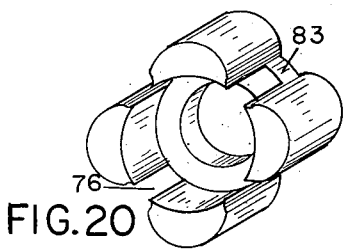

FIGURE 19 shows a tool having the shape of a tooth of the outer gear in FIG. 16 suitable for generating the tooth space of the inner gear in FIGS. 16 and 20.

FIGURE 20 is a perspective view of the inner gear in FIG. 16 showing the modified tooth space.

Figure 21:
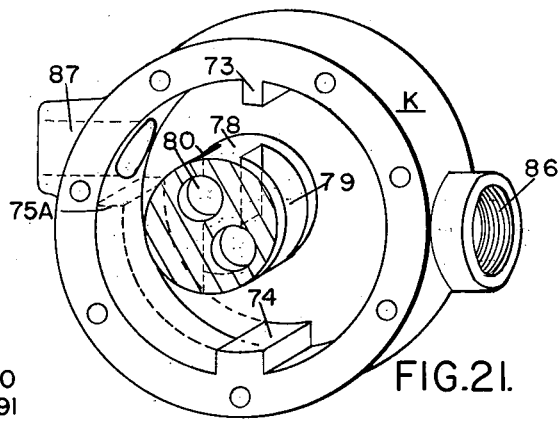

FIGURE 21 shows a casing with abutments between the external ports and a shaft member for supporting the inner gear with ports and abutments in it inside the inner gear.

Figure 22:
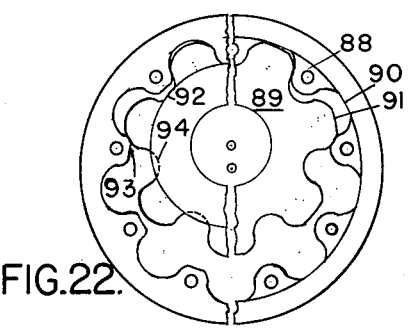

FIGURE 22 shows a pair of rotoids having 7 and 9 teeth. The right half shows the curves modified for external ports. The left half shows the curves modified for internal ports.

Figure 1:
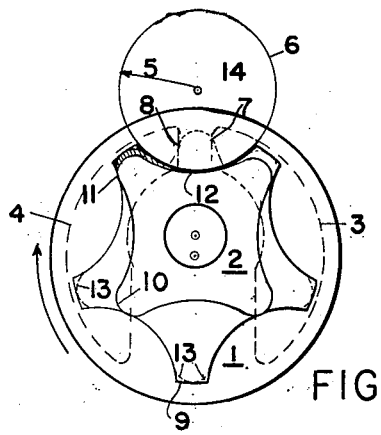

The 5 toothed outer Gerotor 1 and 4 toothed inner gear 2 are shown in FIG. 1 with the intake port 3 and discharge port 4 shown in dashed lines. Each large outer gear tooth has a radius 5 equal to that of the circle 6. At full mesh the ports are separated by an abutment having a width 7—8 equal to that of the outer gear tooth space 9. These gears are standard equipment in many automobiles. The flat shaped outer gear tooth space curves 9 provide clearances outside of the inner gear tooth 10 at full mesh. These clearances would cause re-expansion in a gas compressor. In order to avoid such inefficiency the outer gear space curves 13 are shown in dashed lines at 13.

The close clearances at 11 and 12 or contacts between the iner and outer gear curves imprison fluid in the hatched closing chamber so that the liquid has to be forced out. If the outer gear drives the inner gear in the direction of the arrow there is a very small clearance at 12 of approximately 0.007 of an inch between these gears. If the inner gear 2 drives the outer gear 1 there is a very close clearance at 11 and 12 is a contact a little to the left of the center line at full mesh. Hatching represents the liquid in this space. Gears 1½ inches long having the same diameter as in FIG. 1 and running at motor speed can not entirely expel all the fluid in the $\frac{1}{1000}$ of a second taken to reach full mesh at the end of discharge port 4. This causes jamming of liquid and power loss when there are no clearances between the teeth of one gear and the bottoms of the tooth spaces of the other gear as they rotate through full mesh.

Figure 3:
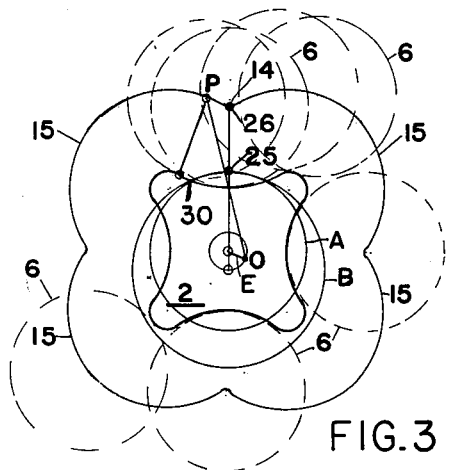
FIGURE 3 shows the circroids with a long circroidal addition upon which the gears in FIG. 1 are based.

The geometry for the gears in FIG. 1 are shown in FIG. 3. When the center 14 of the master form 6 moves along the four circoids 15 it will outline or generate the curves of the inner gear 2. Circroids 15 can be drawn by tracing the path of the outer ratio circle B's extended radius OP as B rolls around on the inner gear's ratio circle A. This is described in Patent Re. 21,316. Another and simpler way to draw the circroids is to swing the eccentric arm E about the inner gear center, attach the extended radius OP to it and rotate it about its own center O at the end of E ⅕ of a degree for each degree turn of E.

Figure 5:
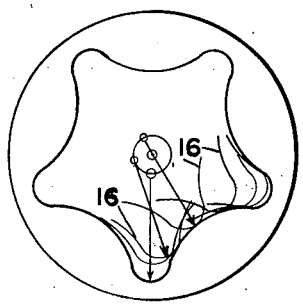
FIGURE 5 shows a profile of a tooth in FIG. 1 of the inner gear suitable for generating the outer gear in FIG. 1. Various positions are shown.

FIG. 5 shows how the entire outer gear teeth and tooth spaces are outlined or generated by a cutter 16 having the same profile as the inner gear teeth in FIG. 1.

Figure 2:
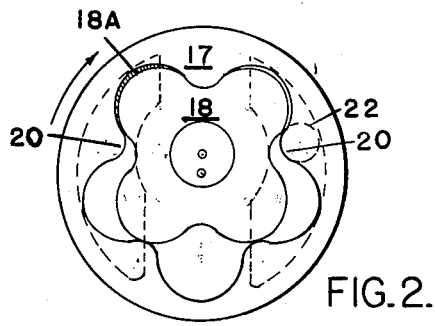
Figure 4:
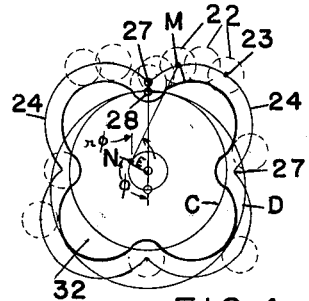
FIGURE 4 shows the circroids with a short circroidal addition upon which the gears in FIG. 2 are based.

In FIG. 2 is another type of Gerotor gears 17 and 18. The outer gear 17 has small circular teeth 20 as compared to the large teeth 5 in FIG. 1. By having the circle 22 with its center 23 follow along the circroids 24 the entire gear 18 can be described, outlined or generated in FIG. 4, when the circle 22 has the same radius as the circular teeth 20 in FIG. 2. The circroidal addition 27—28 in FIG. 4 is much shorter than the circroidal addition 25—26 in FIG. 3. The driving angles between the teeth in FIG. 2 are much better than those in FIG. 1. The width of the circroidal cusp 26 in FIG. 3 is much greater than that of the cusp 27 in FIG. 4. This is why the tooth space curve 30 in FIG. 3 has a larger average radius of curvature than the generating circle 6 or outer gear tooth in FIG. 1. In FIG. 4 the difference in radii between an outer gear tooth form 20 and the inner gear tooth space curvature is so small it can not be shown in this size drawing—which is the actual size of the gears.

Many types of Gerotor gear curves are on the market which have circroidal additions of different lengths and teeth of different sizes and shapes.

Figure 6:
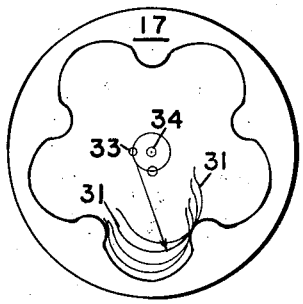
FIGURE 6 shows the profile of a tool having the form of a tooth of the inner gear in FIG. 2 suitable for generating the teeth and tooth spaces of the outer gear in FIG. 2. Various positions are shown.

In FIG. 6 a tool 31 having the profile of the inner gear tooth 32 will generate the entire teeth and tooth spaces of the outer gear 17.

Figure 7:
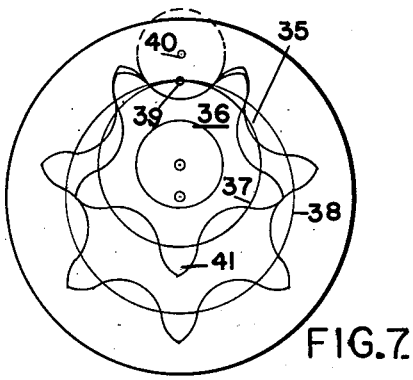
FIG. 7 shows a 5 tooth rotoid gear inside a 7 tooth rotoid gear of the previous art. They have a difference of two in numbers of teeth based on a fractional ratio of 2½ x 3½ which has a difference of one.
Figures 9, 10, 13:
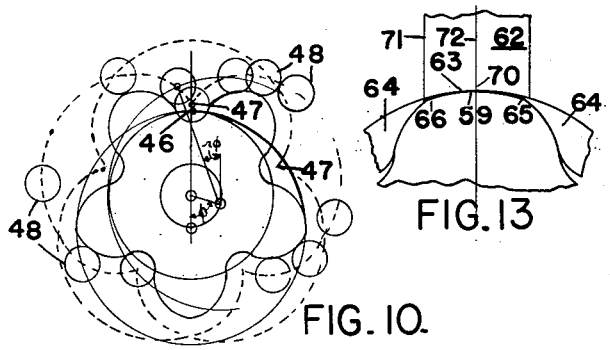
FIGURE 9 shows circroids with a long circroidal addition upon which the gear curves in FIG. 7 are based.
FIGURE 10 shows circroids with a short circroidal addition upon which the gears in FIG. 8 are based.
FIGURE 13 shows an outer gear tooth space opening on the center line at full mesh under an abutment as wide as the tooth space and an inner gear tooth in full mesh.

In FIG. 7 a rotoid outer gear has large teeth 35 with a circroidal addition from 39 to 40. The ratio or pitch circles are at 37 and 38. The rotoid type of circroids 43 are shown in FIG. 9. As the circle 42 with the same radius as the tooth 35 has its center travel along 43 it will generate the inner gear 36. One of the positions of the radicroid or extended radius 44—45 is shown in FIG. 9. In this case when the eccentric arm F rotates $\phi$ degrees the radicroid 44—45 rotates $\frac{2}{5}$ or $r\phi$ degrees about its own center.

Figure 8:
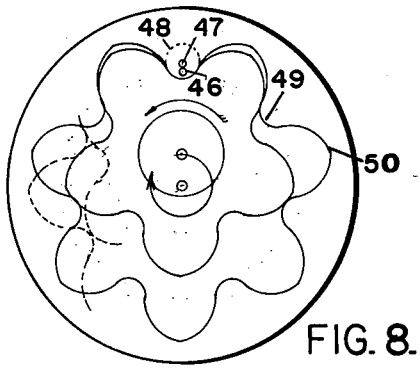
FIGURE 8 shows a pair of rotoid gears with small outer gear teeth.

The rotoid gears in FIG. 8 have a short circroidal addition 46—47 and smaller outer gear teeth 49. The outer tooth space curves are somewhat pointed at 50, but much less so than in FIG. 7. The driving angles between the teeth of the gears is much better than those in FIG. 7. FIG. 10 shows the narrower cusps at 47 than those in FIG. 9 at 40. Due to the cusps always being rounded and never a point, the inner gear tooth space curve always has larger radii than that of the master form tooth on the outer gear. This is a very important factor in Gerotor and rotoid gear design. Speed of rotation throws the fluid being pumped outward into the outer gear tooth spaces. Since the convex teeth of the inner gear fit the tooth spaces of the outer gear every bit of liquid or gas can be expelled. Using the outer gear tooth form for generating the inner gear curvatures is "outside" or "epi" type of generation. It results in the inner gear completely filling the outer gear tooth spaces. Rotoid gear tooth driving angles are considerably better than Gerotor tooth driving angles.

For higher pressures where more gear teeth are necessary, rotoid gears have more capacity per diameter than Gerotors.

In the "hypo" or "inside" type of generation the inner gear tooth generates the outer gear tooth space. Due to the cusp the space curve of the outer gear is wider than the generating tooth. Consequently the inner gear tooth can never completely fill this outer tooth space. "Hypo" generation should never be used for gears pumping or compressing gas.

A small inner gear tooth will minimize this descrepancy between its own size and that of the outer gear tooth space. But the smaller outer gear tooth space results in the openings into the chambers being too narrow.

The circle 48, which has the same radius as the tooth 49, is shown in various positions on the circroids shown in dashed lines. Ovals, ellipses, and other forms may be substituted for the circle 48. When such forms are used they are fastened to the radicroid or extended radius of the outer gear ratio circle when drawing or using the geometry in gear designing.

Figure 11:
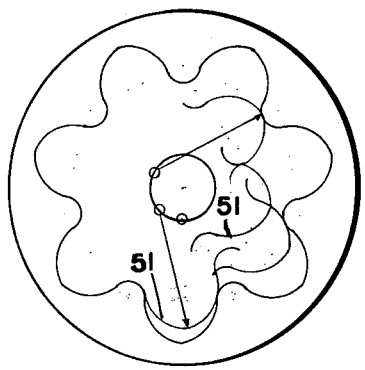
FIGURE 11 shows the profile of a tool suitable for generating the tooth spaces and flanks of the teeth of the outer gear in FIG. 8. It can not generate the extreme tips of the outer gear teeth.

In FIG. 11 the cutting tool 51 having the profile of the inner gear teeth in FIGS. 8 and 10 will generate the tooth spaces and the flanks of the outer gear but not the circular tips of the teeth 49 in FIG. 8. It is shown in different positions in FIG. 11.

Figure 12:
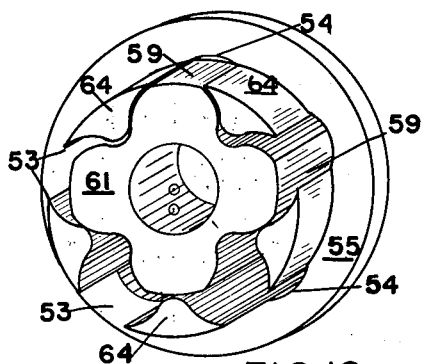
FIGURE 12 is a perspective view of the gears in FIG. 2 showing tooth space openings in the outer gear and the modified shapes of the tips of the teeth of the inner gear.

In FIG. 12 an outer gear 55, similar to the gear 17 in FIG. 2, has had its periphery turned down through out part of its length in order to open up the tooth spaces 53. If the outer gear 1 in FIG. 1 had been turned down to the same extent the tooth space openings would have been too small and narrow.

The reduced circumference of the outsides of the teeth 64 now lies inside the original bottoms 54 of the tooth space curves. The teeth of the inner gear 18 in FIG. 2 would project out through the tooth spaces 53 at full mesh and would clash with the full mesh abutment 62 shown in the enlarged view in FIG. 13. Therefore the inner gear tooth tips 59 have been turned down or just enough reduced in height so as not to project through the openings 53. Tips 59 have a running fit with the inner surface 63 of the abutment 62 at the center line 70 at full mesh. The radius of curvature of this reduced tip 59 in FIGS. 12 and 13 is its distance from its own gear center which is smaller than the radius of curvature of the inner surface 63 of the abutment. Consequently the closest running fit of the inner gear tooth tip 59 is right on the center line at 72. This is true in theory. In practice there will be slight variation due to bearing tolerances.

Figure 14:
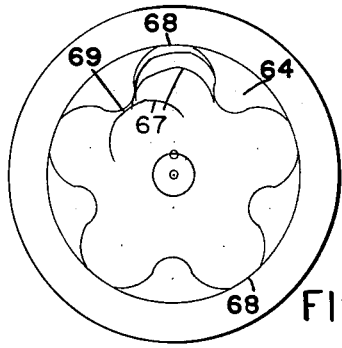
FIGURE 14 shows a tool form (in various positions) having the shape of the modified pinion tooth in FIG. 12 suitable for generating the modified tooth spaces of the outer gear in FIGS. 14 and 15.

There will now be too much clearance between the gear tooth tips 59 and the original bottoms 54 of the tooth space curves of the outer gear 55. In FIG. 14 a tool having the profile of a gear tooth 59 in FIG. 12 will generate a tooth space curve 68 in the outer gear which will eliminate the clearances between 59 and 54 in FIG. 12. This tool 67 is shown in various positions in FIG. 14. It will not generate the tips of the teeth of outer gear. This allows clearance between the tips of the inner and outer gear teeth at 69 on the center line at open mesh. In a well designed gear under 3 inches in diameter these reductions in heights of tooth tips and diameter of the outer gear should lie between 0.005 and 0.009 of an inch. In order to clearly illustrate them in the drawings they have been exaggerated considerably.

In the enlarged view in FIG. 13 the modified tooth tip 59 is in the full mesh position under the abutment 62. The inner surface 63 of the abutment has a radius of curvature sufficient for a running fit with the outside surfaces of the teeth 64 of the outer gear in FIG. 12. Consequently the radius of curvature of 63 is larger than that of the tips 59 of the inner gear teeth. There are slight clearances at 65 and 66. Clearance 65 is zero on center line at 70. When the gears rotate clockwise the clearance at 66 reduces to zero on the center line at 70. The clearance at 65 is opening of course. The closing space 66 can trap fluid and cause jamming of fluid and extra load on the bearings of the gears. By reducing the thickness of the abutment 62 so that its high pressure side 71 is moved to coincide with the line of centers at 72 jamming of lubricating fluid can be prevented.

Figure 15:
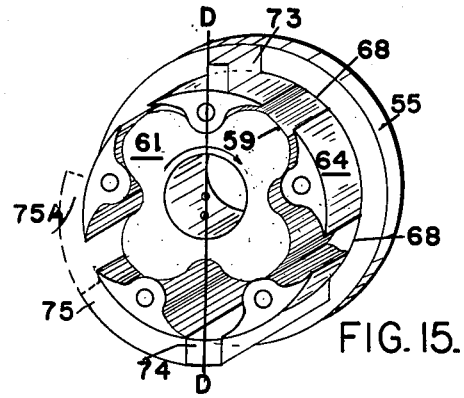
FIGURE 15 is a perspective view of the modified gears in FIG. 2 showing the location of the port abutments.

The perspective view in FIG. 15 shows the inner gear 61 with modified tooth tips 59, modified outer gear tooth space 68 and the high pressure side of the abutment 73 on the line of centers D—D at full mesh.

The open mesh abutment 74 may vary in length extending from open mesh to 75 or 75A according to pressure requirements.

The enlarged view in FIG. 18 shows how the sealing of high pressure fluids from the low pressure intake is maintained on the line of centers at full mesh D—D between the abutment 73 and the inner gear tooth in the three positions of A—A, B—B and C—C. Of course the outer periphery of the teeth 64 have a sealing relation with the full width of the abutment 73 or the abutment 62 in FIG. 13.

In FIGS. 16 and 17 both ports 79 and 80 are inside the inner gear 18 of FIG. 2 which is bored out as shown. The inner gear tooth space curves are open at 76 which is outside of the original inner gear tooth space curves. Consequently the outer gear tooth tips have to be bored out to 81 for a running fit with the abutment 77 between the ports 79 and 80. This makes these tips 81 concave instead of convex.

The inner gear tooth space curve 83 (in FIG. 20) has to be generated by a form tool such as that in FIG. 19. The circular cutting edge has the same radius as the tooth (in FIGS. 2, 4, 6, 14 and 15) of the outer gear. The edge 85 has the same radius of curvature as the bored out tips 81 of the outer gear teeth. The radius of curvature of the inner abutments between ports 79 and 80 will be the same as that of the port member 78 inside of the inner gear openings 76. The radius of curvature of the tips 81 is equal to the distance from its center G to the port member on the center line at full mesh. The clearance J between the tips of the inner gear teeth and outer gear concave tips is shown on the center line at open mesh in FIG. 16. End plates 81A support the gear teeth.

In geometrical generation the tool form 82 would be mounted on a radicroid N—M such as that in FIG. 4 with its center 84 in FIG. 19 following along the circroids 24. It will generate the convex tooth space curves 83 in FIGS. 16 and 20. It will also generate the convex flanks of the teeth of the outer gear but not the tooth tips as is shown at J on the center line at open mesh in FIG. 16.

In FIG. 21 external and internal porting are shown in the pump casing K. For clockwise rotation of the gears the external intake would be at 86 and discharge at 87. The abutments 73 and 74 seal the intake side from the discharge side. The inner port member 78 of FIG. 16 is shown partly in section. In an actual pump it would extend out and through a cover plate. The open mesh abutment 74 may extend to 75A when compressing gas to higher pressures.

The rotoid gears in FIG. 22 have 9 teeth on the outer gear 88 and 7 teeth on the inner gear 89. These gears are shown split in half through the line of centers. The right half shows the tooth and tooth spaces curves modified for external porting. Tooth space openings in the outer gear are at 90. The outer gear tooth space curve is shaped as 68 was shaped in FIG. 14 by the modified inner gear tooth tips 91.

The left hand half of FIG. 22 shows the inner gear tooth spaces 92 and outer gear tooth tips 93 modified for internal porting just as they were in FIGS. 16, 17, 19 and 20 by using the type of geometry in FIG. 10 instead of that in FIG. 4. FIG. 10 would have to be drawn for a 7 to 9 ratio instead of the 5 to 7 ratio shown. 88 can be mounted between end plates like 81A in FIG. 17. By opening the bottoms of the tooth spaces so that they connect directly with the exterior or interior ports jamming of lubricant and loss of power is prevented.

My invention consists of changing the tips or tops of the teeth to a different curvature in one gear and using its form to generate tooth space forms in the bottom of said spaces of the other gear so as to have ports either inside or outside of the gears in direct contact with opening and closing chambers between the inner gear and outer gear teeth.

It consists in reducing the diameter of the outside of the outer gear enough to have openings in its tooth spaces, and then reducing the diameter of the teeth of the inner gear so that the tops or tips of the inner gear teeth will have a radius of curvature equal to the distance from the inner gear tooth center to the reduced outside periphery of the outer gear teeth on the center line at full mesh (see FIG. 12).

This new inner gear tooth shape is then used to generate an outer gear tooth space (see FIGS. 14 and 15). The above is for external porting.

For internal porting I increase the bore of the inner gear so as to open its tooth spaces directly into an internal port. Then the tips of the outer gear teeth are changed to a concave curvature having a radius of curvature equal to the distance from the outer gear center to the new bore of the inner gear on the center line at full mesh. These new outer gear tooth tips will generate new tooth space curves on the inner gear which are outside of the original tooth space curves of Gerotors or rotoids of the previous art.

Briefly my invention consists of having the tooth tips and the bottoms of the tooth spaces generated by an entirely different form from that which is used for the master tooth form.

What I claim is:

1. In a rotary mechanism for handling fluids, a casing including an outer gear and an inner gear, said outer gear surrounding and eccentric to said inner gear, a shaft member supporting said inner gear, a shaft and at least one end plate supporting said outer gear, said gears having intermeshing teeth forming chambers between them which open and close during rotation, said teeth having driving contours characterized by curves on the teeth of each gear described or outlined by the teeth of the other gear at relatively steady angular speeds, said driving contours maintaining fluid tight contacts with each other in the full mesh region between opening and closing chambers and travelling tooth engagements in the open mesh regions, said driving contours having instant centers of curvature far enough outside of the ratio or pitch circles to maintain said contacts and engagements, inlet and outlet ports, openings in the bottoms of the tooth spaces of at least one gear to connect said chambers directly to said ports, said openings being long enough axially and wide enough circumferentially for efficient ingress and egress of fluids entering and leaving said chambers, at least one full mesh abutment and at least one open mesh abutment between said ports, said full mesh abutment being at least half as wide circumferentially as said openings and at least as long axially as said openings, having tips of the teeth of at least one gear modified in shape from that of the true outlined or described curve by being reduced in height and shaped to have a close running fit with said full mesh abutment and at the same time expel all fluid from the closing chambers, said open mesh abutment being at least as wide circumferentially as said openings and at least as long axially as said openings to prevent fluid from escaping from one of said ports to the other of said ports, whereby said driving contours, said modified tooth tips and said abutment at full mesh cooperate to permit exit of fluid from the closing gear chambers as they rotate through the full mesh region without the jamming or trapping of fluid and consequent loss of power while said modified tooth tips also provide an empty crescent shaped space at open mesh of no tooth engagement.

2. The combination claimed in claim 1, said openings being shorter in axial length than said gears, and having the bottom of the tooth space curves between said openings and the end or ends of said gears modified in shape from that of the true generated form by being outlined or described by said modified tooth tips of the other gear as they rotate through the full mesh region.

3. The combination claimed in claim 1, and having both of said ports in the casing outside of said gears, the tooth tips of said inner gear only being modified in shape, with said abutments having a running fit with the periphery of the outer gear.

4. The combination claimed in claim 1, and having both of said ports inside the inner gear in a shaft supporting said inner gear, said openings being between the teeth of said inner gear, both of said abutments having a running fit with the bore of said inner gear, and said full mesh abutment also having a running fit with the modified tooth tips of the outer gear.

5. The combination according to claim 1, having one port in a shaft member inside the inner gear and the other port in the casing outside the outer gear, each of said gears having openings in the bottoms of their tooth spaces, having the tooth tips of each gear modified in shape, and having one of said abutments at full mesh with a running fit with the periphery of the outer gear and the modified tooth tips of the inner gear while the other abutment at full mesh has a running fit with the bore of the inner gear and the modified tooth tips of the outer gear, and one of said abutments at open mesh has a running fit with the periphery of the outer gear while the other abutment at open mesh has a running fit with the bore of the inner gear.

6. The combination claimed in claim 1, and having said openings the same axial length as said gear teeth of the outer gear which are mounted on at least one end plate.

7. The combination claimed in claim 1, and having a difference of one in the numbers of teeth of the gears.

8. The combination claimed in claim 1, and having the number of teeth in one gear vary from the number of teeth in the other gear by a fractional ratio having a difference of one.

9. The combination claimed in claim 1, having the teeth of the outer gear smaller than the teeth of the inner gear to provide circumferentially wider openings between the teeth of the outer gear for a given reduction in height of said modified inner gear teeth and better driving angles between said teeth of said gears.

10. The combination claimed in claim 1, and having both ports in the casing outside of said gears, only the tooth tips of said inner gear being modified in shape, said abutments having a running fit with the periphery of the outer gear, and having a difference of one in the numbers of teeth of said gears.

11. The combination claimed in claim 1, and having both of said ports inside said inner gear in a shaft supporting said inner gear, said openings being between the teeth of said inner gear, both of said abutments having a running fit with the bore of said inner gear, said full mesh abutment also having a running fit with the modified tooth tips of the outer gear, and having a difference of one in the numbers of teeth of the gears.

12. The combination claimed in claim 1, having one port in a shaft member inside the inner gear and the other port in the casing outside the outer gear, each of said gears having openings in the bottoms of their tooth spaces, having the tooth tips of each gear modified in shape, and having one of said abutments at full mesh with a running fit with the periphery of the outer gear and the modified tooth tips of the inner gear, while the other abutment at full mesh has a running fit with the bore of the inner gear and the modified tooth tips of the outer gear, and one of said abutments at open mesh has a running fit with the periphery of the outer gear while the other abutment at open mesh has a running fit with the bore of the inner gear, and having a difference of one in the numbers of teeth of the gears.

13. The combination claimed in claim 1, and having both ports in the casing outside of said gears, only the tooth tips of said inner gear being modified in shape, said abutments having a running fit with the periphery of the outer gear, and having the number of teeth in one gear vary from the number of teeth in the other gear by a fractional ratio having a difference of one.

14. The combination claimed in claim 1, and having both ports inside the inner gear in a shaft supporting said inner gear, said openings being between the teeth of said inner gear, both of said abutments having a running fit with the bore of said inner gear, and said full mesh abutment also having a running fit with the modified tooth tips of the outer gear, and having the number of teeth in one gear vary from the number of teeth in the other gear by a fractional ratio having a difference of one.

15. The combination claimed in claim 1, having one port in a shaft member inside the inner gear and the other port in the casing outside the outer gear, each of said gears having openings in the bottoms of their tooth spaces, having the tooth tips of each gear modified in shape, and having one of said abutments at full mesh with a running fit with the periphery of the outer gear and modified tooth tips of the inner gear, while the other abutment at full mesh has a running fit with the bore of the inner gear and the modified tooth tips of the outer gear, and one of said abutments at open mesh has a running fit with the periphery of the outer gear while the other abutment at open mesh has a running fit with the bore of the inner gear, and having the number of teeth in one gear vary from the number of teeth in the other gear by a fractional ratio having a difference of one.

References Cited in the file of this patent

UNITED STATES PATENTS

| | | |
|---|---|---|
| Re. 21,316 | Hill | Jan. 9, 1940 |
| 1,515,192 | Dinesen | Nov. 11, 1924 |
| 1,802,527 | Nichols | Apr. 28, 1931 |
| 1,970,146 | Hill | Aug. 14, 1934 |
| 2,011,338 | Hill | Aug. 13, 1935 |
| 2,124,140 | Foster et al. | July 19, 1938 |
| 2,416,987 | Fleischer | Mar. 4, 1947 |
| 2,601,288 | Hill | June 24, 1952 |
| 2,601,397 | Hill et al. | June 24, 1952 |
| 2,666,336 | Hill et al. | Jan. 19, 1954 |
| 2,909,033 | Hill | Oct. 20, 1959 |